UNITED STATES PATENT OFFICE

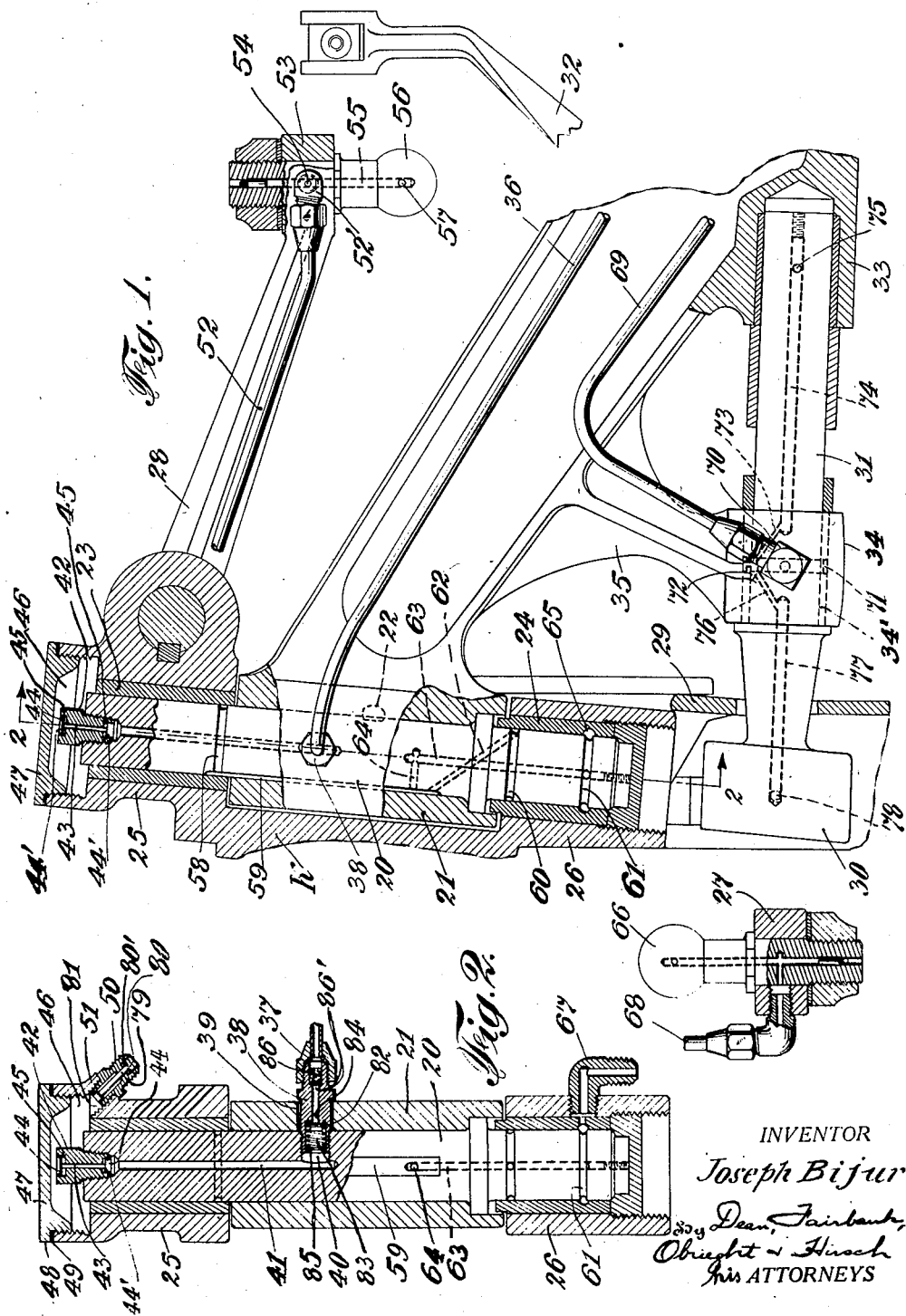

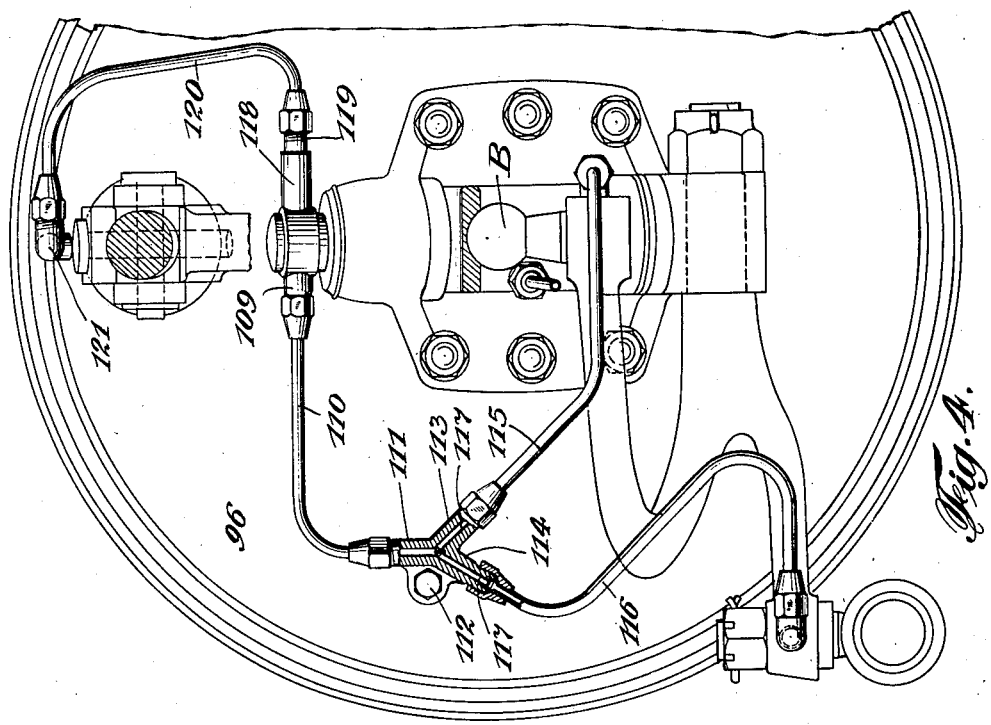
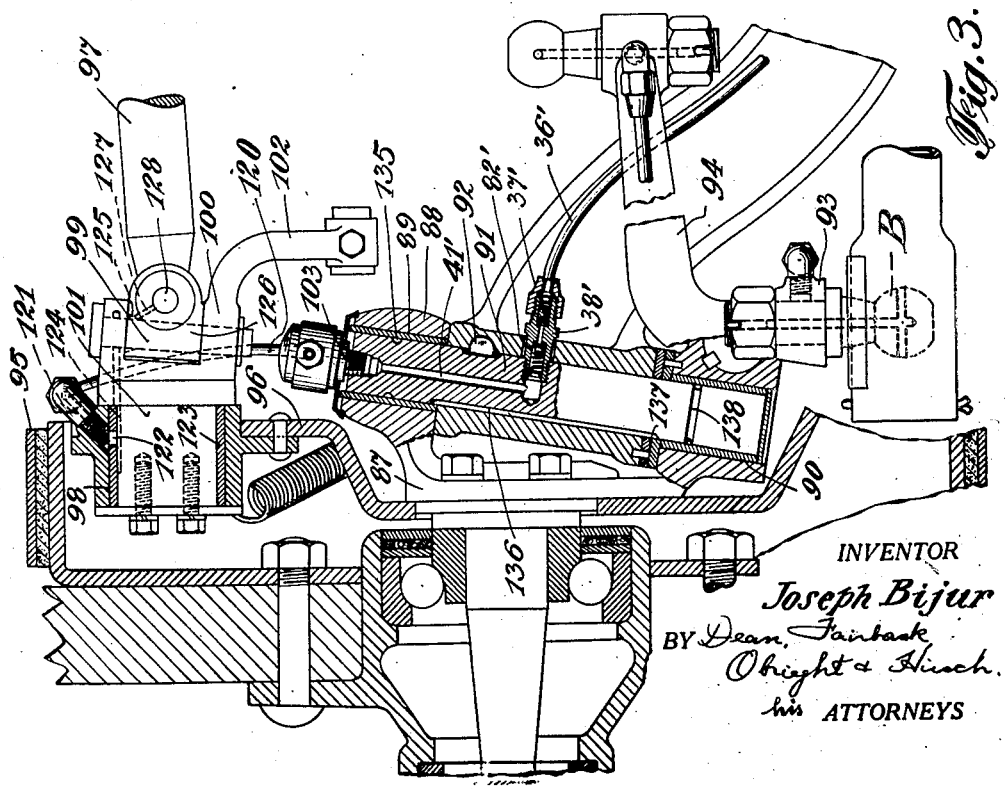
INVENTOR
Joseph Bijur
BY Dean, Fairbank
Wright & Hirsch
his ATTORNEYS June 7, 1932.  J. BIJUR  1,862,488
CHASSIS LUBRICATION
Filed Nov. 8, 1923   5 Sheets-Sheet 3
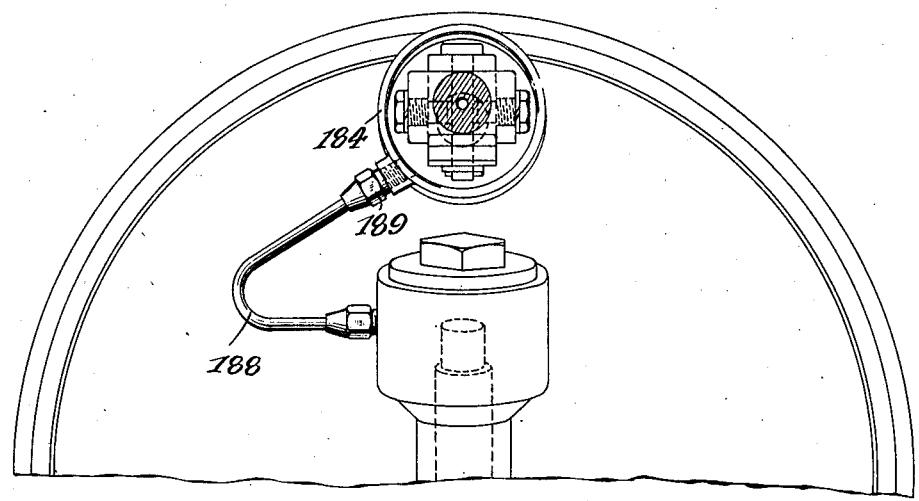
Fig. 8.
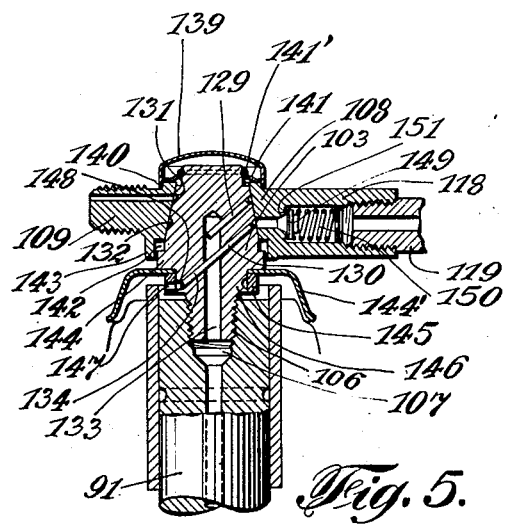
Fig. 5.
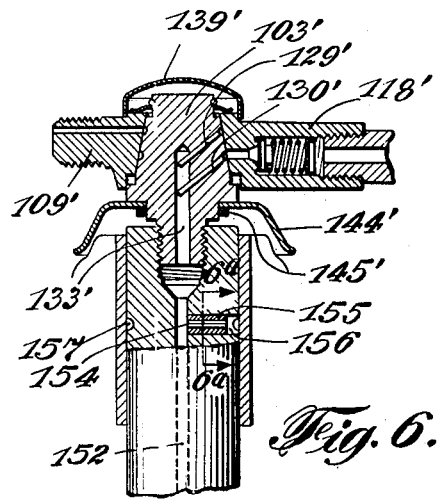
Fig. 6.
Fig. 6a
INVENTOR
Joseph Bijur
BY his ATTORNEYS

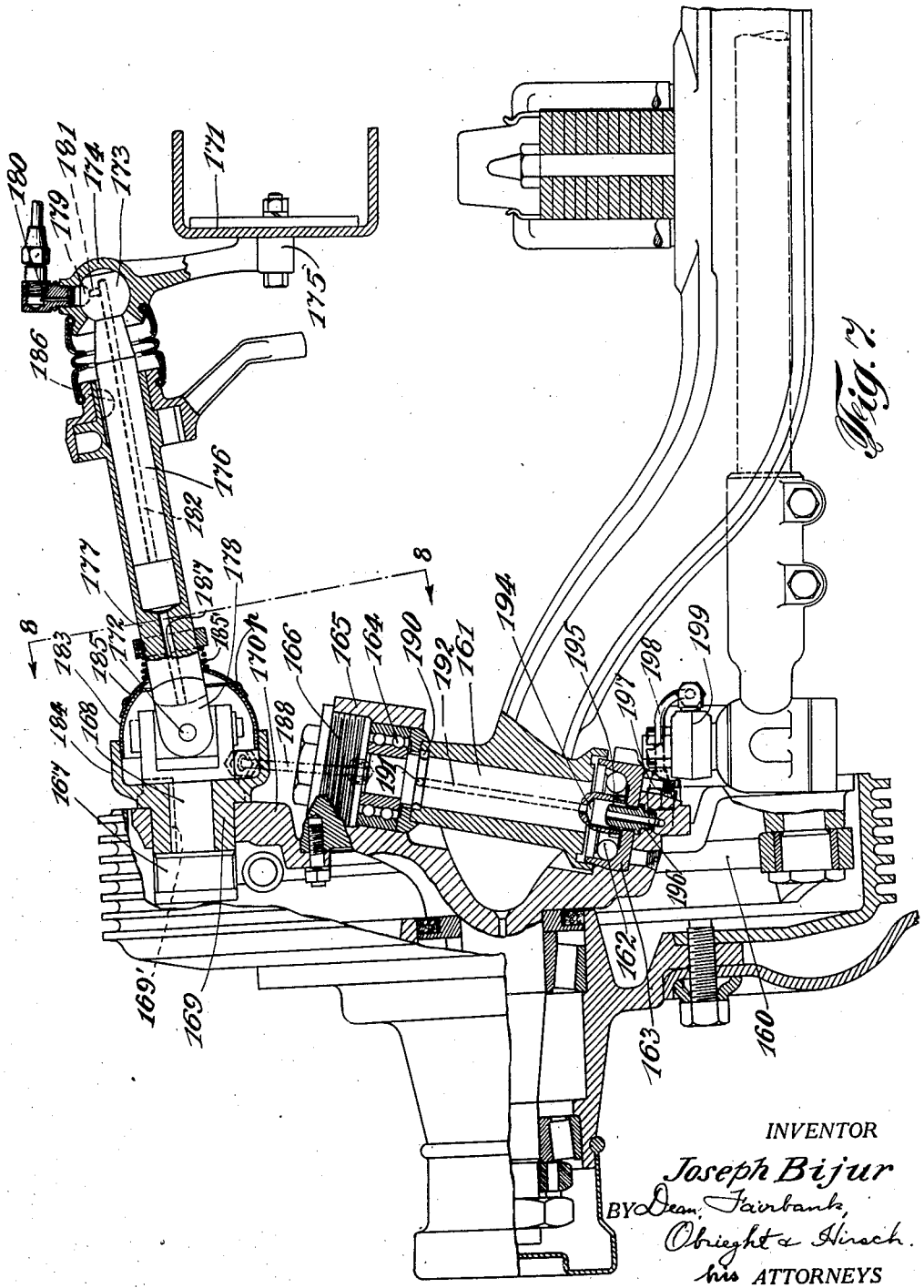

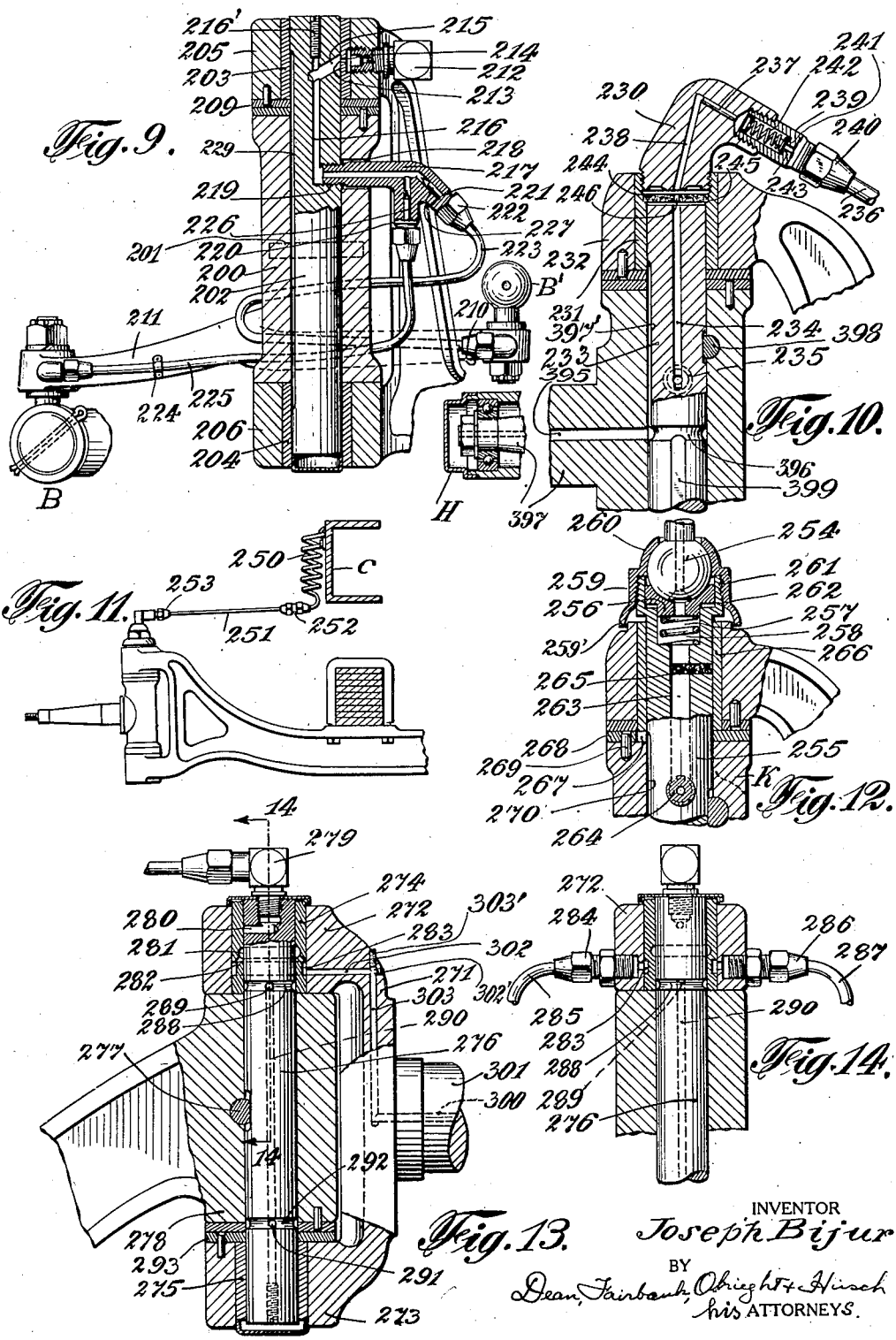

JOSEPH BIJUR, OF NEW YORK, N. Y., ASSIGNOR, BY MESNE ASSIGNMENTS, TO AUTO RESEARCH CORPORATION, A CORPORATION OF DELAWARE

CHASSIS LUBRICATION

Application filed November 8, 1923. Serial No. 673,519.

My present invention relates to chassis lubrication and is more especially concerned with the lubrication of the bearing or wearing surfaces associated with the front wheel knuckle, including some or all of the following: the king pin bearings, the tie rod and steering arm bearings, the wear surface of the brake cam and the various bearings or parts of the brake operating shaft.

The invention is concerned particularly with the lubrication of the elements referred to, designated generically "the front wheel control appurtenances", and, if desired also, the front wheel spindle, from a single source on the chassis or axle.

Among the objects of the invention are to provide an arrangement of connecting conduits or passages through which the various knuckle bearings are supplied from the source, which conduits shall be devoid of protruding or projecting parts likely to become caught or torn off, or of sagging or limber parts likely to whip or flap in regular use of the vehicle, yet will accommodate the pivoting or steering movement of the knuckle, without harmful strain.

Among other objects are to provide lubricating appurtenances of the character described, which shall be of simple and rugged construction, readily applicable to knuckles of various known types, without substantial alteration thereof, and which shall function to lubricate adequately all of the bearings, without excessive overflow and without waste or loss in the path of flow to the bearings or to any of them.

A desirable construction of inlet conduit is of metal pipe and extends out of the path of the knuckle pivoting movement to a bore in the king pin, which leads to a distributer on the knuckle, metal piping from the distributer extending along structural parts of the knuckle to all or some of the bearings carried thereby.

In one special embodiment, the supply conduit extends along the axle and feeds directly into the stationary king pin and between the ends of the latter, the lubricant passing upward through the bore of the king pin to a dividing or distributer appliance rigid with the knuckle and coaxial with the king pin. In another embodiment, the supply conduit bridges in a self-sustaining substantially non-sagging line from the channel frame direct to the top of the king pin, the lubricant passing downward through the king pin on its way to some or all of the bearings. The construction includes a distributer at a relatively high level on the knuckle for gravity flow of the lubricant therefrom to various bearings.

In operation it is desirable to sustain pressure on the lubricant, no farther along the piping than up to the point of entry to the pivoting knuckle unit, so that no lubricant pressure is applied at any swiveling surface between the stationary and pivoting portions of the knuckle mount and loss of lubricant is avoided.

Among various arrangements for assuring correct distribution of lubricant between the bearings on the knckle, flow control devices, such as restriction or damming pins may be provided near the lubricant inlet at the knuckle, and in the paths of flow to the king pin bearings and to the various knuckle bearings, or an annular collecting chamber about the king pin may be charged by lubricant passed from the king pin or from the bearing surface thereof, which chamber is drained through appropriate pipes carried by the knuckle and leading to one or more control bearings, or lubricant flowing downward through the king pin bore to the bearings may be in part intercepted by a transverse wick or pad of felt contacting, and thus lubricating the king pin bearing surface.

The distributer may be a collecting chamber in the knuckle and above the king pin, from which lubricant flows by gravity to the king pin bearings and in parallel therewith to one or more of the bearings carried by the knuckle. Lubricant that is passed down from the distributer chamber to the lower bearing of the king pin may be collected in an annular chamber preferably below the king pin bearing surface, from which it passes to the tie rod bearing, through a conduit along the tie rod arm.

In another embodiment, in lieu of the collecting chamber, a swivel unit is provided, one element of which is rigid with the king pin and the other with the knuckle, the latter constituting a distributer. Where a brake or other control mechanism is provided at a level higher than the king pin, one of the pipes from the swivel may extend upward to lubricate said mechanism, an appropriate flow control means being provided to assure division of the lubricant between the bearings at higher level and those at lower level than the swivel.

In the drawings:

Fig. 1 is a sectional view partly in elevation, indicating one embodiment of the invention, Fig. 2 is a view in longitudinal section taken along the line 2—2 of Fig. 1, the main length of tie rod being omitted, Fig. 3 is a view similar to Fig. 1 of a modification, Fig. 4 is a side view of the embodiment shown in Figure 3, with parts broken away, Fig. 5 is a fragmentary sectional view of one embodiment of swivel that may be used in the embodiment of Fig. 3, Fig. 6 is a view similar to Fig. 5 showing both ends of the king pin, with the intermediate part broken away, of alternative means for lubricating the king pin bearings, Fig. 6a is a fragmentary sectional view on an enlarged scale taken along the line 6a—6a of Fig. 6, Fig. 7 is a view similar to Figs. 1 and 3 of a further modification, Fig. 8 is a fragmentary view taken along the line 8—8 of Fig. 7, Fig. 9 is a sectional view longitudinally of the vehicle, through another embodiment of lubricating knuckle, Fig. 10 is a fragmentary sectional view of a further embodiment, partly in elevation, taken along a line transversely of the vehicle, Fig. 11 is diagrammatic view indicating a conduit bridging from the chassis frame to the king pin, Fig. 12 is a fragmentary sectional detail view through the king pin indicating a mode of distributing lubricant in the embodiment of Fig. 11, Fig. 13 is a sectional view through a knuckle showing another modification, and;

Fig. 14 is a fragmentary sectional view taken along the line 14—14 of Fig. 13.

In Figs. 1 and 2, I have shown a known construction of knuckle, the shaft or spindle for the wheel of which is shown broken away. The knuckle comprises a king pin 20 fixed in the eye 21 of the front axle as by a pin 22, and having bearings at its opposite ends in bushings 23 and 24 fixed within the respective clevis jaws 25 and 26, which are integral parts of the knuckle. In this particular embodiment, the tie rod arm, the end 27 only of which is shown, is integral with the lower clevis jaw 26 of the knuckle. The steering arm 28 provided on the left-hand knuckle extends rigid as shown in Fig. 1 from the upper clevis jaw 25 thereof. The particular embodiment of knuckle may also include a front wheel brake, only the shield 29 of which is shown, operated from a cam 30 upon the end of a rock shaft 31, which, in turn, is operated from an arm 32 and is lodged in a bearing 33 within the axle and a bearing 34 in lug 35 integral with the axle.

For lubricating the various bearings on the knuckle described, which taken by itself is not my invention, a metal supply pipe 36 extending lengthwise along the axle, is connected at its delivery end by a union 37 to a fitting which extends with clearance 39 through the eye 21 of the axle and is threaded at its inner end into a socket 40 substantially midway between the ends of the king pin. The fitting 38, the details of which will be described hereinafter, communicates in the present embodiment with a bore 41 extending axially and longitudinally of the king pin through the upper end thereof. A seepage fitting 42 is threaded into the upper end of the king pin, said fitting having a longitudinal bore of about $\tfrac{1}{16}''$ in diameter, within which fits a pin 43, only about .004'' smaller in diameter. To prevent the pin 43 from falling out of the bore of the fitting friction-fitted end caps 44 are lodged in corresponding sockets 45 at opposite ends of fitting 42, to retain the pin 43 from rising or falling out of the bore therefor, said caps having perforations 44' out of alignment with pin 43 for flow of the lubricant through the fitting.

The upper clevis jaw 25 extends upward above the top of the seepage fitting 42 to provide a collecting or distributing chamber 46 which is closed against entry of foreign matter by a screw cap 47, the flange 48 of which compresses an interposed gasket 49. The distributing chamber has an outlet fitting 50 threaded into a socket 51 sloping downward from the bottom thereof and connected by a metal pipe 52 which extends therefrom lengthwise of the contiguous arm 28, to lubricate the bearing thereof. The outlet 52' of pipe 52 is threaded into collar 53 of the arm 28, to communicate through a radial duct 54 with a longitudinal duct 55 through the usual ball or equivalent bearing stud 56, the latter in turn, delivering through radial ducts 57 to the bearing surface thereof. A peripheral groove 58 about the king pin near the bottom of the upper bushing 23 collects the excess lubricant that has passed direct to the king pin bearing from chamber 46. Groove 58 drains to a flat 59 in the king pin, which supplies two grooves 60 and 61 about the lower king pin bearing. The upper of the grooves 60 is connected to the lower end of flat 59 through a duct 62 extending obliquely through the king pin. The lower groove 61 is supplied through a longitudinal or axial duct 63 in the king pin, in turn, communicating with the flat 59 through a radial duct 64. Lubricant from groove 60 seeps downward to lubricate the lower king pin bearing. The lower groove 61 preferably communicates with the tie rod bearing 66 by an elbow outlet fitting 67 through the knuckle clevis 26, the fitting 67 being connected to pipe 68 extending along the tie rod.

The brake elements heretofore described, may be lubricated through a pipe 69 connected to pipe 36 at a part not shown, and delivering through a seepage fitting 70 at the bearing 34, to a peripheral groove 71 in the bushing 34', from which a well 72 at the upper surface of the shaft 31 is supplied, the latter draining through an oblique duct 73 to bore 74 in the shaft 31, from which bearing 33 is supplied through a radial duct 75. A similar oblique duct 76 extends forward from the well, communicating with a bore 77 through the shaft, extending outward therefrom, the latter, in turn, supplying the wear surface of the cam 30 through one or more radial passages 78 therethrough. The seepage fitting it will be understood may be of construction like that of my Patent No. 1,632,772 of June 14, 1927, and includes a restriction outlet similar to that in fitting 43, so that upon application of high pressure from a common source to the pipes 36 and 69, lubricant will be forced in parallel through said restriction outlets in fittings 42 and 70, assuring accurate division therebetween.

To avoid draining excess lubricant from the collecting chamber 46 to the steering arm at the expense of lubricant desired for oiling the king pin and tie rod bearings, the nipple fitting 50 is provided with a damming pin 79, which may be retained in place by a friction-fitted cap 80. The damming pin 79 provides clearance greater than that of restriction pin 45, and sufficient to assure division of the lubricant from the distributing chamber 46 in appropriate proportions between the king pin and the steering arm. The nipple 51 provides a well 81 below the bottom of distributer 46 which will, of course, be filled with lubricant, before the level thereof can rise in chamber 46, the lubricant in said well being thus segregated for passage to the steering arm bearing, rather than to the king pin bearing, so that the steering arm bearing will be lubricated even though damming pin 50 be too tight for ready flow of the oil.

To avoid draining the bore 41 through the king pin after each operation, which might hamper the operation of the system, in that a limited charge from the source would in that event have to re-fill the empty bore 41, before pressure would be transmitted to the drip plug or drip plugs, it is preferred to provide the inlet fitting 38 with a check valve constituting in the preferred embodiment, a disk valve 82 seated by a coil spring 83 against a seat 84 formed integral with the fitting, the coil spring reacting against a friction-fitted perforated cap 85. I have shown also in the present embodiment a wad of felt 86 at the inlet end of the fitting which serves as a strainer to intercept any small particles or impurities that might be conveyed through the pipe 36. Metal gauze 86' at the outlet side of the gauze prevents forcing the same or fibres thereof to the valve seat 82.

In operation, upon application of pressure at the source, lubricant will be passed in parallel through pipes 36 and 69, the rate of discharge being controlled by the seepage fitting 42 at the top of the king pin and the seepage fitting 70 at the cam shaft. It might be preferable to provide a clearance for the pin 43 somewhat greater than for the pin (not shown) of seepage fitting 70, or for other seepage fittings on the line, so that oil would be delivered through the former at a proportionally greater rate to provide more oil for supplying the correspondingly greater area of bearing surface lubricated therefrom. Lubricant flows by gravity from the distributing chamber 46, through fitting 50 and pipe 52 to the steering arm bearing surface, and in parallel therewith from the chamber 46 to bushing 23 which drains to the lower bushing 24 in the manner previously described, from which elbow fitting 67 taps lubricant for passage through pipe 68 to the tie rod bearing 66.

It will be seen that both the supply and distributing pipes extend in most direct course respectively, to and from the knuckle axis, and along structural parts of the vehicle, so that these pipes though in themselves rugged, are, moreover, not exposed to damage. The transfer of lubricant from the stationary axle to the pivoted knuckle takes place by passage through the length of the king pin which itself is mechanically strong and well protected.

In Figs. 3 and 4 is shown an alternative embodiment which includes an axle, and a knuckle 88 with a clevis having bushings 89 and 90 in the upper and lower jaws thereof constituting bearings for a king pin 91 pinned as at 92 to the axle substantially as in Fig. 1. In this embodiment of knuckle, the tie rod arm 93 is near the lower end of the knuckle and the steering arm 94 also is at relatively low level, as shown. An external brake 95 is provided, the shield 96 of which is secured to the knuckle structure. The brake is operated through mechanism only part of which is shown, including an operating shaft 97 bridging from the frame (not shown) and having a bearing 98 within the upper part of the brake shield and above the king pin. The shaft includes a universal joint 99 substantially in line with the king pin and thereabove to accommodate in cooperation with a ball and socket joint (not shown) at the frame end, the relative displacement incurred between the axle and the frame, as well as to accommodate the pivotal or steering movement of the knuckle. The clevis 100 of the universal which is integral with the journaled end of the rock shaft 101 has an integral arm 102 from which the brake is operated through connecting mechanism (not shown).

For lubricating the present embodiment which as thus far described taken by itself is not my invention, the lubricant is admitted to the king pin through a conduit 36', an inlet fitting 38', and an axial bore 41' extending upward therefrom through the king pin in manner identical with the disclosure of Fig. 1, corresponding parts here being designated by the same reference numerals as in Fig. 1 but primed. In this embodiment, in lieu of the distributing chamber in Fig. 1, I provide a distributing swivel co-axial with the king pin, comprising a male or plug member 103 (see Fig. 5) threaded as at 106 into a socket 107 in the upper end of the king pin and accordingly rigid with the king pin and the axle, and a female or collar member 108 encircling said plug member and mounted to rotate or rock thereabout in the steering movement of the knuckle. In this embodiment, the swivel collar has an outlet nipple 109 connected by metal pipe 110 to dividing fitting 111 anchored by screw 112 direct to the brake shield 96, the dividing arms 113 and 114 of said fitting connected through pipes 115 and 116 respectively to the tie rod and steering arms, said pipes extending along the brake shield and lengthwise of the respective arms to the bearings B at the ends thereof, which have lubricant ducts similar to those in Fig. 1. The dividing fitting has damming pins 117 in the arms thereof, with clearance sufficient to assure substantially accurate division of lubricant passed by gravity flow to bearings B.

The distributing or swivel collar has a second outlet nipple 118 diametrically opposite the nipple described, connected by fitting 119 to a pipe 120, which extends upward therefrom and delivers into an outlet fitting 121 extending obliquely through the brake shaft bearing 98. The fitting 121 delivers through aperture 122 in the bushing 123 to a groove 124 lengthwise of the shaft 101, extending around the upper end of universal pin 126, from which part the lubricant passes downward to collect in recess 125, also about pin 126 from which an oblique duct 127, in turn, passes lubricant to the other pin 128 of the universal.

To assure correct division of the lubricant between the downward branch 110 to the tie rod and steering arm bearings and the upward branch 120 to the brake shaft bearings, I provide restriction pins 129 and 130, preferably in the plug member 103 of the swivel, said pins as in the embodiment previously described, being preferably about $\tfrac{1}{16}''$ in diameter and having clearance in the order of .004'' within the oblique bores through the plug, in which they are lodged. In the embodiment shown, the crevice about pin 129 delivers to a peripheral groove 131 about plug 103 which, in turn, discharges through nipple 109. Pin 130 delivers at its upper end to a peripheral groove 132 which discharges to nipple 118. Pin 130 extends across the axial inlet passage 133 in the swivel plug as at 134, so as to afford a second outlet for lubricant under pressure, to drip lubricant upon the top of king pin 91, from which it will seep to the king pin bearing 89 and 90. The lubricant collects in and spreads from a peripheral storing groove 135 about the upper bearing of the king pin, the excess passing along a flat 136 in the king pin, diametrically opposite inlet fitting 38' and delivering to the thrust bearing 137 and to the lower king pin bearing 90, which also has a peripheral storing groove 138. In the preferred embodiment, the parts are maintained substantially dust-proof by a dust cap 139 over a corresponding pilot 140 on the swivel collar, enclosing the holding means between the swivel parts. The holding means, as shown, may comprise a spring washer 141 reacting at its outer periphery against the swivel collar and at its inner edge against a split ring 141' about the protruding end of the swivel plug 103, or against a cotter pin through the latter. The swivel collar does not bottom with respect to the swivel plug, but leaves clearance 142 which will be gradually taken up to maintain the swivel unit tight as it wears. A skirt 143 on the collar is telescoped over flange 144 on the plug to prevent entry of dust therebetween from the bottom. Preferably the swivel plug also has a dust cap 144' extending as a hood over the knuckle. A clamping collar 145 is telescoped over shank 146 at the lower end of the swivel plug and secures cap 144' in place thereon. An outlet 147 through collar 145 passes the drip from pin section 134 to the top of the king pin, peripheral groove 148 about the swivel plug shank establishing communication between the crevice of pin section 134 and outlet 147, regardless whether or not said elements are radially aligned, as shown in the drawings.

To avoid loss of lubricant, after each operation from the upward extending pipe 120, which loss might interfere with the reliable lubrication of the brake shaft bearings, I provide a check valve 149 pressed against a seat 151 integral with the nipple 118.

In operation it will be seen that upon application of lubricant pressure on the pipe 36', the lubricant will force open the valve 82' and that the pressure will be transmitted upward through duct 41', thence will take three courses determined by the high resistance to flow imposed by pin 129, pin section 130 and pin section 134, upon all of which the pressure is exerted simultaneously. Lubricant which is forced past pin 129, flows about peripheral groove 131, through nipple 109 and pipe 110 to be divided at the fitting 111 for continued flow to the bearings respectively of the tie rod and steering arm. Lubricant forced past pin section 130 will advance the body of lubricant confined between said pin and valve 149, to force the latter open, elevating the column of lubricant in pipe 120 to deliver from the upper end thereof, through the fitting 121 as lubricant is admitted past valve 149. The lubricant from fitting 121 passes to the bearing 123 of the brake operating shaft and to the associated universal joint bearings, as heretofore described. Simultaneously with the operation described, lubricant is forced past pin section 134, dripping upon the top of the king pin, from which it passes downward to lubricate the bearings thereof in manner previously described.

In Figs. 6 and 6a is shown a construction generally similar to that of Figs. 3 to 5, modified, in that the lubricant is passed to the king pin bearings, without first entering the swivel plug. The swivel construction is identical with that of Fig. 5, and the parts thereof bear the same reference numerals as those of Fig. 5 primed, however. Restriction pin 130', corresponding to pin 130 in Fig. 5, terminates at the bore 133' and no lubricant passage is required for the collar 145' which presses the dust cap 144' against the swivel plug 103'. The king pin bore 152 extends longitudinally through the entire length of the king pin and is plugged at its lower end as at 153 to prevent loss of lubricant therefrom. The longitudinal bore 152 leads to the upper king pin bearing through a restriction outlet, radially through the king pin. The restriction comprises a hexagonal or other polygonal metal pin 154 friction-fitted into a sleeve 155, which may be of the same metal, the latter tightly jammed into radial bore 156 and leaving a clearance space with respect to the bearing surface and in registry with a peripheral groove 157 about the king pin. A duplicate of the construction described may be provided at the lower bearing, corresponding parts bearing the same reference numerals primed. It will be seen that no special means is here required to maintain the restriction pins in place, since the angle bar edges thereof bite into the bushing, the passage being reduced to the minute crevice between the bore of the sleeve and the faces of the pin. Lubricant pressure transmitted past the inlet valve located as at 82' in Fig. 3, is transmitted in parallel to pins 129', 130', 154 and 154', each of which preferably provides resistance to flow corresponding to the proportion of the lubricant desired at the corresponding bearing or bearings.

It will be understood that the restriction pin 154' at the lower king pin bearing 90' may be dispensed with, excess lubricant delivered to the upper king pin bearing being passed as through a connecting flat to the lower bearing, substantially as in Fig. 3.

In all of the specific embodiments shown and described, the inlet pipe extends to a part rigid with the axle and the distributing piping extends from a distributer rigid with the upper end of the knuckle pivot. The lubricant pressure through the inlet conduit is absorbed or dissipated in the neighborhood, but in advance of the inlet to the distributer, so that high pressure will not be applied at any swiveling surface between the stationary and movable parts of, or on the knuckle pivot, to pass the lubricant from the elevated distributer to the various bearings.

In Figs. 7 and 8 is shown lubricating means for a knuckle which differs from that indicated in Fig. 3 in the use of an internal brake 160 rather than an external brake, and in the provision of ball bearings for the king pin 161, the latter pressing upon a thrust ball bearing 162 within the bottom cap 163 thereof, that is, secured to the knuckle and having ball bearings 164 in the top knuckle clevis jaw 165, the latter closed at its upper end by a screw plug 166. The brake is operated from a cam 167 having a stud shaft 168 which can rock in a bearing 169 rigidly mounted on the brake shield 170. The cam is actuated from an operating shaft bridging directly from the channel frame 171 to the knuckle. In order to accommodate the relative movement of the knuckle and the channel frame incurred both in the deflection of the springs of the vehicle and in the steering action, a universal joint 172 is provided between the main length of the bridging shaft and the stud shaft 168, the center of rotation of said universal being substantially axially aligned with the king pin. The bridging shaft includes a ball 173 having a bearing within a ball socket 174 rigidly mounted as at 175 upon the channel frame and a rod 176 integral with said ball and telescoped into a sleeve 177 formed integral with the clevis 178 of the universal joint.

To lubricate the various bearings on the construction, which, as thus far described, taken by itself is not my invention, the ball 173 is provided with a well 179 in its upper surface into which a lubricant supply fitting such as a seepage fitting 180 supplies lubricant which drains through a duct 181 and a longitudinal bore 182 in the shaft 176. The universal joint 172 is enclosed by a spherical shell 183, threaded into flange 184 on the bearing 169, maintained closed in the rocking movement of the clevis by a cap 185, which encircles the shaft 177 and is pressed by spring 185' against said shell, packing ring *p* maintaining the cap closure dust-tight. Lubricant delivered through bore 182 passes to the shell 183 through bore 187 in the clevis end of sleeve 177. A key 186 maintains the sleeve 177 and rod 176 against relative rotation, so as to maintain the well 179 substantially aligned with the inlet fitting at all times.

A short section of pipe 188 is connected by fitting 189 into the flange 184 and delivers to the ball bearing 164. The king pin is provided with a peripheral groove 190 immediately below the ball bearing 164 communicating through ducts 191 with a longitudinal bore 192, through the king pin 161, the latter having a recess 194 at its lower end, into which extends a stand-pipe element 195 threaded into the knuckle as at 196. The stand-pipe 195 communicates through an outlet fitting 197 to a delivery pipe 198, which extends along tie rod 199 to the bearings at the free end thereof in a manner apparent from previous descriptions. In the present embodiment, I have illustratively indicated the lubrication of a right-hand knuckle, it being understood that in the case of the left-hand knuckle, the steering arm bearing could be lubricated, in manners obvious from previous descriptions.

In operation, upon lubricant dripping from the fitting 180, it will pass from the well 179 downward through bore 182, whence it passes through bore 187 into the shell 183. The pipe 188 which taps the shell 183 from a part above the bottom thereof, drains lubricant to the upper king pin ball bearing 164, the excess from which collects in the king pin groove 190 and drains through bore 192 to the thrust bearing 162. Lubricant above the level of the top of stand-pipe 195 drains through the latter and through pipe 198 to lubricate the tie rod bearing. Thus the bearing cap 163 will be drained only to the level of the top of the stand-pipe 195, so that sufficient oil remains in said cap to adequately lubricate. The lubricant lodged in the bottom of shell 183 is splashed about in the operation of the vehicle to oil the bearing 169 and the pivot pins of the enclosed universal joint, bearing 169 having a groove 169' along which lubricant passes to oil the wear surface of cam 167.

In Fig. 9 of the drawings, I have shown a conventional front wheel knuckle construction, comprising a knuckle hub 200 pinned as at 201 to the king pin 202, the latter mounted in bushings 203 and 204 respectively in the upper jaw 205 and the lower jaw 206 of the usual clevis on the end of the front axle. The usual thrust washers 209 are interposed between the upper surface of the knuckle and the upper clevis. The knuckle has the usual integral tie rod arm 211 thereon with a bearing B at its outer end for the tie rod (not shown) and the left-hand or steering knuckle illustratively shown in the drawings, has the usual additional steering arm 210 with a bearing element B' at its outer end, coacting with the usual drag link (not shown).

The various bearings of the construction thus far described, which taken by itself is not my invention, may be lubricated by the arrangement now to be described. A lubricant inlet fitting 212 is threaded into the upper clevis jaw of the axle, preferably at the rear side thereof, where, by reason of its protected position, it is not likely to suffer any impact in traffic. In the preferred embodiment shown, this fitting comprises a seepage-fitting of the type previously described, supplied through a metal pipe (not shown) along the length of the axle, and transmitting lubricant pressure from any appropriate source on the frame or the axle. The bushing 203, as indicated in the drawings, has a small transverse aperture 213 at the bearing surface thereof, registering with the seepage-fitting and countersunk to provide a small chamber 214 into which the lubricant from the seepage-fitting will enter. The king pin is provided with a downwardly sloping bore 215 of diameter substantially larger than that of the aperture 213, communicating with an axial bore 216 through the king pin, the latter being preferably formed by boring from the end of the king pin and plugging as at 216'. The bore 216 communicates with a dividing fitting 217 extending with clearance 218 through the knuckle hub and threaded as at 219 directly into the king pin. The arms 220 and 221 of the dividing fitting extend preferably in a plane approximately at right angles to the wheel spindle. The branch arm 220 of the dividing fitting is connected to a metal pipe 225 which extends along the knuckle to the tie rod arm 211 and lengthwise thereof to the bearing B, appropriate staples as at 224 being provided, if desired, to maintain the pipe closely associated with the arm. A similar conduit pipe 223 is similarly connected to the other arm 221 of the dividing fitting by the union 222 and extends to and lengthwise along the steering arm 210 to the bearing B' thereof. The precise relation of pipes 225 and 223 to the bearings B and B' need not be here described, as it may be identical to the showing in Fig. 1.

In order to assure correct distribution of the lubricant between the tie rod and steering arms, damming pins 226 and 227 may be provided in the respective arms 220 and 221 of the dividing fitting, and serving to restrict the gravity flow of the lubricating oil substantially as in the dividing fitting shown in Fig. 4. The king pin is provided with a flat 229 extending from the upper bearing bushing 203 to the lower bearing bushing 204 thereof, said flat preferably diametrically opposite the inlet 215 of the bore 216.

In operation, upon application of pressure to the lubricant, the seepage-fitting 212 will drip lubricant into the cavity 214 and after the latter is substantially filled, lubricant will be forced slowly through the small aperture 213 to the bearing surface of the upper bushing 203, over which it spreads readily, excess passing by gravity flow downward through the duct provided by the flat 229 to the lower bearing 204, to lubricate the latter. A substantial portion of the lubricant supplied through the aperture 213 will, however, be intercepted by the upper edge of the oblique bore 215 and will flow downward by gravity therealong through the longitudinal duct 216 to the fitting 217 where it is divided, passing onward through the respective pipes 223 and 225 to the corresponding bearings, in the manner apparent from the previous description.

It will be seen that the present construction includes a seepage-fitting having but a single restriction pin and yet effects reliable division of the lubricant supplied thereby between the upper and lower king pin bearings, the tie rod and the steering arm bearings. It will be noted that the lubricant-propelling pressure is absorbed in the seepage-fitting, so that the lubricant passes under little pressure past the swiveling surface, between the upper bushing 203 rigid with the axle and the king pin 202 rigid with the knuckle, and this bearing surface need, therefore, not be pressure-tight.

Referring now to Fig. 10, I have shown a fragmentary view of a conventional knuckle construction, similar to that of Fig. 9, with an alternative arrangement for lubrication. Here, the lubricant inlet is an elbow fitting 230 threaded direct into the upper end of the bearing bushing 231, of the upper clevis jaw 232 and above the upper end of king pin 233. The king pin has a longitudinal bore 234 extending through the upper end thereof and draining lubricant to a dividing fitting 235 which latter may be identical with that in Fig. 9 and applied in identical manner. The inlet fitting 230 in the present embodiment, as in that of Fig. 9, is supplied through a pipe 236 extending along the axle and sloping upward along the upper axle clevis 232, and includes a restriction pin 237 fitting with minute clearance as in the case of seepage-fittings, heretofore described, to drip upon application of pressure through an oblique outlet duct 238 upon the king pin. In order to maintain the line normally filled and to prevent entry of air thereinto, a relief valve fitting 239 is threaded into the inlet end of the elbow fitting 230 and is connected to the pipe 236 as through a union 240. The valve unit is of construction specifically claimed in my prior patent above identified, and may comprise a disk valve 241 seated by a coil spring 242 upon annular seat 243 formed integral with the valve casing 239. To provide lubricant for the king pin bearing, I employ a felt pad 244 pressed into the bushing 231 which is preferably stepped as at 245, substantially at the level of the upper end of the king pin, said pad having a central hole 246 of diameter somewhat smaller than the bore 234 through which a substantial portion of the drip from the elbow fitting 230 will pass for delivery to the bearings of the knuckle, the remainder being intercepted by the felt pad 244 and spread by the capillary action thereof to the bearing surface of the king pin. It will be seen that lubricant passes from fitting 230 on the axle to the bearings on the knuckle, without the aid of a swivel, but by drip through the gap between said fitting and the top of the king pin, and that fitting 230 constitutes a tight closure to prevent entry of dust into the oil passage.

In the present embodiment I have shown means for passing oil to the bearing of wheel spindle 397 from the pipe 236. For this purpose, said spindle is provided with a longitudinal bore 395 delivering to the interior of the hub cap H and supplied at its inner end from a groove 396 about the king pin, the latter, in turn, supplied through the duct determined by flat 397' on the king pin, which flat terminates at the groove and delivers the excess lubricant from the upper king pin bearing. The securing pin 398 maintains the flat 397' of the king pin firmly pressed against the knuckle hub, so that the lubricant passes along said flat to groove 396 without leak. A flat 399 extends downward from a part of groove 396, that is spaced from bore 395, to deliver a part of the lubricant for oiling the lower king pin bearing (not shown). The spindle oiling arrangement may be employed as an auxiliary for softening the grease usually packed into the hub cap, or the arrangement shown may be used as a substitute for grease lubrication of the wheel spindle.

In Figs. 11 and 12 is shown another embodiment for lubricating the various knuckle and knuckle control bearings from a single source, and also illustratively applied to a conventional knuckle construction of the type shown in Fig. 9. Referring to the diagrammatic view of Fig. 11, I here show a lubricant supply conduit bridging directly and independently of the axle from the channel frame to the knuckle. This bridging run is shown diagrammatically, and may include a helical seamless metal pipe 250 anchored to the channel frame C and extending downward therefrom and draining to a transverse pipe element 251 secured thereto by a fitting 252, said transverse element having a seepage-fitting near its delivery end, indicated diagrammatically as at 253 and delivering to a ball outlet 254 (see Fig. 12) supported within a corresponding socket member carried by the top of the king pin 255. The socket includes a cup element 256 fitting into a corresponding depression 257 at the upper end of the king pin and urged upward by coil spring 258 into contact with the ball, which latter is confined in place by a cap 259 formed with a spherical bearing surface 260 for the ball and threaded as at 261 upon a flange 262, formed integral with the king pin 255 and encircling the cup element 256. A skirt 259' integral with the cap serves as a dust seal for the upper clevis jaw. An axial bore 263 through the king pin extends downward to deliver into a dividing fitting 264, part of which is broken away, which is of the same construction and serves for the same purpose as the dividing fittings shown in Figs. 9 and 10. To lubricate the king pin bearings, I have illustratively shown a small length of wick 265 of diameter smaller than that of bore 263, extending thereacross and through a radial bore near the upper end of the king pin to establish a wicking communication to the upper king pin bushing 266. The wick, it will be seen, intercepts some of the lubricant dripping from the inlet fitting through bore 263 and passes such lubricant to the upper bushing 266, over which it spreads. The excess lubricant from said bushing is drained into a notch 267 in the inner periphery of the usual thrust bearing washer 268 that is pinned as at 269 to the knuckle K, whence the lubricant drains through a flat 270 to supply the lower bearing (not shown) in the manner indicated in Fig. 9.

In operation, the bridging conduit 250—251 with its universal ball and socket joint outlet readily accommodates the ascent and descent of the axle relative to the chassis in running of the vehicle, the ball 254 rocking within its socket about a horizontal axis at right angles to the axle and the helix 250 flexing slightly to accommodate the relative approach and recession of the outlet end of the bridging run relative to the inlet end. The steering movement of the knuckle is accommodated, by the movement of the socket structure 256—260 with the king pin about the stationary ball outlet 254.

In Figs. 13 and 14 is shown another arrangement for lubricating the various bearings associated with the king pin knuckle from a single source. The present embodiment is of particular utility in a knuckle construction of the type which has an integral clevis 271, the jaws 272 and 273 of which have bushings 274 and 275 respectively constituting the upper and lower bearings for the king pin 276, the latter pinned as at 277 to the vehicle axle, the end 278 of which is straddled by the knuckle clevis jaws. I have here shown a lubricant inlet 279 which may be a seepage fitting, threaded axially into the top of the stationary king pin 276 and delivering to a radial bore 280 through the king pin, which communicates with the bearing surface of the upper bushing 274. The bushing 274 is provided with an inner peripheral groove 281 between the ends thereof, which communicates through one or more downwardly extending ducts 282 through the bushing with a peripheral groove 283 at the outer surface thereof. In this embodiment, I have shown illustratively, an outlet fitting 284 threaded into the clevis jaw 272 and communicating with the groove 283, said outlet fitting connected by a metal pipe 285 extending along structural parts of the knuckle and along the length of the tie rod arm (not shown) to the tie rod bearing, in manner similar to the showing in the other figures. I have here also shown a second fitting 286, which may be diametrically opposite fitting 285 and also supplied from peripheral groove 283, to be connected by pipe 287 to the steering arm bearing in the manner shown in the other figures.

In this embodiment, I have also shown illustratively means for delivering oil to a bore 300 in wheel spindle 301 either auxiliary to or in lieu of the usual grease lubrication for the wheel spindle, all as above described in connection with Fig. 10. In the present embodiment, the oil for the wheel spindle is tapped from groove 283 through a horizontal duct 302 in the upper clevis jaw of the knuckle, which duct is plugged at 302' and delivers to a vertical duct 303 plugged at 303' extending through the knuckle communicating with spindle bore 300.

The king pin is here shown provided with a peripheral groove 288 near the lower level of the upper bushing, said groove communicating through one or more radial ducts 289, and an axial or longitudinal bore 290, with radial bore 291, delivering into a groove 292, about the king pin and substantially at the level of the thrust washers 293, intervening between the lower knuckle clevis jaw 273 and the axle supported thereon.

In operation upon application of pressure at the source of lubricant, the discharge of the seepage-fitting 279 passes through radial duct 280 to the upper bushing 274, spreading downward and collecting in the groove 281, from which the oil is drained to groove 283 through ducts 282 and also along the bearing surface of the bushing into the king pin groove 288. Lubricant collecting in exterior bushing groove 283 drains in parallel through fittings 284 and 286 and duct 303 to the tie rod and steering arm and wheel spindle bearings. Lubricant in king pin groove 288 flows inward through ducts 289 and downward through longitudinal bore 290 for delivery at the lower peripheral king pin groove 292, whence it spreads outward and downward to lubricate both the bearing surface of the thrust washer 293 and the lower bearing bushing 275 of the king pin 276.

It will be understood, of course, that flow control means, such as the draining pins shown in Fig. 9, may be provided in fittings 284, 286 and in the duct 302, to assist in the distribution of the lubricant between the tie rod, the steering arm and the wheel spindle bearings, and that a single dividing fitting similar to that shown in Fig. 9 may be substituted for the two separate fittings 284 and 286.

In all of the embodiments in which the supply pipe extends along the axle, that is, in all embodiments other than those of Figs. 7, 8, 11 and 12, the outlet of said pipe is rigid with the axle and may, therefore, be of relatively stiff seamless metal. The dividing or equivalent fittings, in all embodiments, are preferably rigid with the knuckle, as are, of course, the tie rod and steering arms, and the bearings thereof, so that the connecting piping between said elements, need accommodate no motion and can also be and preferably is of relatively stiff seamless metal piping.

Although I have shown means for lubricating the wheel spindle only in the embodiments of Figs. 10, 13 and 14, it will be understood that the arrangements there shown may be applied to various other embodiments shown.

Although in the various embodiments shown, highly restricted outlets are shown at or in advance of the inlet to the knuckle, it will be understood that other types of inlet fittings could be substituted and that appropriate oil cups or other hand-filled lubricant feeding elements might be mounted upon the knuckle, in lieu of the distributers, for lubricating the various knuckle bearings therefrom, through connecting piping of substantially any of the types shown.

The accompanying claims are directed to methods of distributing the lubricant to the knuckle bearings to which knuckle are attached proportioning devices containing dams or restrictions such as the element 50 of Fig. 2, the element 111 of Fig. 4, and the element 217 of Fig. 9. These elements are preferably fixed in respect to and movable with the knuckle structure. With these elements may be associated distributing fittings, such as the element 42 of Fig. 2, and the inner swivel elements of Figs. 5 and 6 which are fixed in respect to the axle or king pin and movable relatively to the knuckle. In Figs. 5 and 6 the outer swivel elements serve as distributing means to feed the lubricant to the various knuckle bearings and function in this manner similarly to the element 50 of Fig. 2 and element 111 of Fig. 4.

The subjects matter specifically shown and described, but not claimed in the present application, are included in copending applications Serial No. 672,870, filed November 5, 1923; Serial No. 13,139, filed March 5, 1925; Serial No. 39,415, filed June 25, 1925; Serial No. 58,704, filed September 26, 1925; Serial No. 174,480, filed March 11, 1927; Serial No. 313,262, filed October 18, 1928; Serial No. 283,426, filed June 6, 1928; and Serial No. 369,408, filed June 8, 1929.

I claim:—

1. The combination of an axle, a steering knuckle, control bearings carried thereon, a king pin pivot mount for said knuckle, upon said axle, a lubricant inlet attached to a part of said pivot mount rigid with said axle, lubricant distributing means movable with the knuckle, means including a duct extending through said king pin to connect said inlet with said distributing means, and an automatic flow control means at said distributing means determining the division of lubricant to said control bearings.

2. The combination of an axle, a steering knuckle, control bearings carried thereon, a king pin pivot mount for said knuckle upon said axle, a lubricant inlet supplied from said axle and attached to a part of said pivot mount rigid with said axle, a distributing fitting in the knuckle, means including a duct extending lengthwise through said king pin to connect said inlet with said distributing fitting, and restriction means in said distributing fitting determining the division of lubricant to said control bearings.

3. The combination of an axle, a steering knuckle, a king pin pivot mount for the latter upon said axle, bearings associated with said knuckle, an inlet secured to a part of said pivot mount rigid with said axle, a distributing fitting movable with said knuckle and in communication with said bearings, a passage to said fitting longitudinally through said king pin from said inlet, and flow control means enclosed in said distributing fitting to determine the supply and distribution of lubricant to the bearings.

4. The combination of an axle, a steering knuckle having a clevis straddling said axle, said knuckle having associated bearings including king pin bearings therefor fixed in said axle, a lubricant supply conduit extending along said axle and delivering into said king pin between the jaws of said clevis, and a duct through said king pin for conducting the admitted lubricant to the upper end of the king pin and lubricant proportioning passages associated with the kin pin for conveying the lubricant from the upper end of the king pin to said bearings, said knuckle carrying lubricant flow restriction means movable therewith and positioned upon said lubricant proportioning passages.

5. The combination of an axle, a steering knuckle having a clevis straddling said axle, said knuckle having associated bearings including king pin bearings fixed in said axle, a lubricant supply conduit extending along said axle and delivering into said king pin between the clevis jaws, and a duct extending upward from said inlet through the top of said king pin, a receiving chamber at the upper end of the king pin and a flow damming arrangement associated with said well and positioned adjacent to the upper end of the king pin to control the lubricant flow to and from said receiving chamber and passages extending from said receiving chamber to said bearings.

6. The combination of an axle, a steering knuckle having control bearings and having a clevis straddling said axle, a king pin therefor rigid with said axle, means for supplying lubricant to the bearings, associated with the knuckle, comprising an inlet feeding transversely into said king pin between the jaws of said clevis, a dividing fitting above said king pin for distributing lubricant to a plurality of the bearings, a duct in said king pin connecting said inlet with said dividing fitting, said dividing fitting having means controlling the distribution of lubricant to the bearings supplied therefrom.

7. The combination of an axle, a steering knuckle having a clevis straddling said axle, a king pin rigid with said axle, and constituting a bearing for the jaws of said knuckle clevis, a tie rod arm rigid with said knuckle, a lubricant distributing fitting at the upper end of said clevis and movable therewith, a lubricant inlet fitted into said king pin, a duct extending upward from said inlet through said king pin to said distributing fitting, said distributing fitting draining to the king pin bearings, and an outlet pipe from said distributing fitting for supplying the tie rod bearing.

8. The combination of an axle, a steering knuckle having control bearings and having a clevis straddling said axle, a king pin bearing therefor in said axle, a lubricant supply conduit extending along said axle and delivering into said king pin between the clevis jaws, a duct through said king pin connecting said supply conduit to a chamber at the top of said king pin, another conduit tapping lubricant from said chamber and extending therefrom to said knuckle control bearing, and means restricting the flow through said conduit.

9. The combination of an axle, a steering knuckle having control bearings and having a king pin pivot mount in the axle end, a lubricant supply conduit connected to a part of said pivot mount rigid with said axle, and communicating with a duct lengthwise of said king pin, another conduit draining lubricant from near the lower end of said knuckle axis to one of the control bearings, and a third conduit draining lubricant from near the upper end of said knuckle axis to another control bearing, said knuckle carrying a lubricant damming arrangement movable therewith and positioned upon one of said conduits draining to a control bearing.

10. The combination of an axle, a steering knuckle with control bearings having a clevis straddling said axle, a king pin rigid with said axle and constituting a bearing for the jaws of said knuckle clevis, a lubricant inlet connected to said king pin between the ends thereof and communicating with a duct lengthwise of said king pin, oil collecting chambers near opposite ends of the king pin supplied with lubricant from said duct, and conduits with restricted inlets draining said chambers and connected for supplying corresponding control bearings upon the knuckle.

11. A steering knuckle having a king pin pivot mount, tie rod and steering arms rigid with said knuckle and having bearings at their outer ends, a lubricant inlet to the knuckle, substantially at the pivot axis thereof, and communicating with a passage lengthwise of said pin, a conduit conveying lubricant from an outlet near the lower end of said king pin and extending lengthwise of said tie rod arm to the corresponding bearing, a second conduit conveying lubricant from an outlet near the upper end of said king pin and extending along the steering arm to supply the bearing thereof, and means movable with the knuckle controlling division of the lubricant between said bearings.

12. The combination of an axle, a steering knuckle having a clevis, straddling said axle, a king pin rigid with said axle and constituting a bearing for the jaws of said knuckle clevis, a tie rod arm rigid with said knuckle, a distributing chamber at the upper end of said clevis, an inlet at said axle extending into said king pin at a point below the upper end thereof, a duct through said king pin connecting said inlet to said chamber, and a draining outlet from said chamber to the bearing of said tie rod arm, said outlet having a restriction to assure correct division of lubricant from said chamber between the bearing surface of said king pin and the bearing of said tie rod arm.

13. The combination of an axle, a steering knuckle having a clevis and an associated bearing, a king pin fixed in said axle and constituting a pivot for said knuckle, a lubricant inlet supplied from said axle and secured in said king pin between the ends thereof, a distributing chamber at the upper end of the upper clevis, communicating with the contiguous king pin bearing, said chamber having a closure, an inlet fitting connected into said king pin between the clevises thereof, a highly restricted control fitting secured in the upper end of said king pin within said distributing chamber, a duct lengthwise of said king pin connecting said inlet to said control fitting, a draining pipe connecting said chamber to supply a bearing associated with the knuckle, and means restricting the flow through said draining pipe to assure sufficient supply of lubricant from said chamber to the king pin bearings directly therebelow.

14. In combination, an axle, a knuckle, a control bearing rigid with said knuckle, a king pin mount for said knuckle in said axle, a dividing chamber in said knuckle near one end of the king pin and in communication with the bearing surface of the latter, a conduit through the king pin having an inlet between the ends of the latter, and serving to supply lubricant to said chamber from an external source, a drain pipe connecting said chamber with said knuckle control bearing, and means at the inlet of said pipe controlling the distribution of lubricant between the bearing surface of said king pin and said knuckle control bearing.

15. The combination of an axle with associated bearings, a steering knuckle having a clevis, a king pin fixed in said axle and constituting a pivot for said knuckle, a lubricant inlet supplied from said axle and secured in said king pin between the ends thereof, a distributing fitting coaxial with said king pin and mounted upon the upper knuckle clevis to move therewith, means including a duct extending lengthwise through said king pin to connect said inlet with said distributing fitting, and highly restricted flow-controlling means determining the flow of lubricant to and through said distributor to said associated bearings.

16. The combination of an axle with associated bearings, a steering knuckle having a clevis, a king pin fixed in said axle and constituting a pivot for said knuckle, a lubricant inlet supplied from said axle and secured in said king pin between the ends thereof, a distributing fitting coaxial with said king pin and mounted upon the upper knuckle clevis to move therewith, means including a duct extending lengthwise through said king pin to connect said inlet with said distributing fitting, and highly restricted flow controlling means determining the flow of lubricant to and through said distributor to said associated bearings, said inlet fitting having a spring-closed relief valve therein to prevent draining of the connecting duct therethrough.

17. The combination of an axle, a steering knuckle, a king pin pivotally connecting the same, control bearings rigid with said knuckle, a lubricant inlet at a part of the knuckle pivot stationary with the axle, a distributing swivel coaxial with the kind pin having one part thereof stationary with the axle and communicating with said inlet through an axial bore in said king pin, the other part of said swivel pivoting with the knuckle, outlet pipes connecting said movable swivel member to the knuckle control bearings, and highly restricted passages in said distributing swivel to control the flow of lubricant to said outlet pipes.

18. The combination of an axle, a steering knuckle, a king pin pivotally connecting the same, control bearings rigid with said knuckle, a lubricant inlet at a part of the knuckle pivot stationary with the axle, a distributing swivel coaxial with the king pin having one part thereof stationary with the axle and communicating with said inlet through an axial bore in said king pin, the other part of said swivel pivoting with the knuckle, outlet pipes connecting said movable swivel member to the knuckle control bearings, and highly restricted passages in said distributing swivel to control the flow of lubricant to said outlet pipes, and an additional restricted passage through said swivel governing the supply of lubricant to the king pin bearings.

19. The combination of an axle, a king pin rigid therewith, a steering knuckle having a clevis pivotally mounted upon said king pin, a lubricant inlet at a part of said knuckle mount rigid with said axle, a restricted lubricant outlet through said knuckle at a part thereof above the lower king pin bearing, a duct through said king pin connecting the inlet and the outlet and a collecting chamber at the top of said king pin supplied from said duct and delivering to said outlet.

20. The combination of an axle, a steering knuckle carrying tie rod and drag link bearings, a king pin pivotally connecting the axle and the knuckle with an upper and lower bearing surface, an inlet for lubricant to said bearings and a liquid conduit system enclosed in part in said knuckle and in part extending along the outside thereof and provided with dammed passageways in said outside portion, said conduit system conveying lubricant from said inlet to said bearings.

21. The combination of an axle, a steering knuckle having an associated bearing, a king pin pivotally connecting the axle and the knuckle with an upper and lower bearing surface, an inlet for lubricant to said bearings and means associated with said inlet assuring proper division of the lubricant to the said upper and lower bearings and to said associated bearing, including a conduit for removing lubricant which has passed through said upper bearing and conducting it in parallel to said lower bearing and associated bearing.

22. The combination of an axle, a steering knuckle, a king pin pivotally connecting the axle and the knuckle with an upper and lower bearing surface, an inlet for lubricant to said bearings and means associated with said inlet assuring proper distribution of the lubricant to the said upper and lower bearings, including means for removing lubricant which has passed through said upper bearing and conducting it to said lower bearing.

23. The combination of an axle, a steering knuckle having an associated bearing, a king pin pivotally connecting the axle and the knuckle with an upper and lower bearing surface, an inlet for lubricant to said bearings, and means associated with said inlet assuring proper division of the lubricant to the said upper and lower bearings and to said associated bearing, including a conduit system leading from said inlet to said upper and lower bearings and to said associated bearing consisting in part of bores to, through and from the king pin which bores from the king pin are dammed to proportion the lubricant among said bearings.

24. The combination of an axle, a steering knuckle having an associated bearing, a king pin pivotally connecting the axle and the knuckle with an upper and lower bearing surface, an inlet for lubricant to said bearings, and means associated with said inlet assuring proper division of the lubricant to the said upper and lower bearings and to said associated bearing, including a conduit through the upper portion of the king pin provided with an overflow at the top of the king pin and flow restriction means for distributing such overflow into the upper and lower king pin bearings and to said associated bearings.

25. The combination of an axle, a steering knuckle having a control bearing and having a clevis straddling said axle, a king pin bearing therefor in said axle, a lubricant supply conduit extending along said axle and delivering into said king pin between the clevis jaws, a duct through said king pin connecting said supply conduit to deliver lubricant to a chamber above the upper end of said king pin, and a restricted conduit tapping lubricant from said chamber and extending therefrom along the outside of the knuckle to said knuckle control bearing.

26. The combination of an axle, a steering knuckle, control bearings carried thereon, a pivot mount for said knuckle upon said axle, a lubricant inlet connected to said pivot mount between the upper and lower end thereof, lubricant passages through and along said pivot mount and restricted conduits upon said knuckle initiating adjacent said pivot mount above and below said inlet, said passages connecting said inlet with said conduits.

27. The combination of an axle, a steering knuckle carrying a tie rod bearing, a king pin connecting the axle and the knuckle and providing pivotal bearings, means supplying lubricant to the pivotal bearings, a conduit originating near the lower end of one of the pivotal bearings and draining to said tie rod bearing, and dammed passageways originating at the upper end of said king pin leading through said bearings and connecting said means and said conduit.

28. The combination of an axle, a steering knuckle having a clevis straddling said axle, a king pin bearing therefor fixed in said axle, a lubricant supply conduit extending along said axle and delivering into said king pin between the jaws of said clevis, and a duct initiating at said supply conduit and extending to the upper end of said king pin connecting said supply conduit to said bearing, a restriction being provided at the end of said duct to regulate the amount of lubricant supplied to the bearing.

29. The combination of an axle, a steering knuckle carrying control bearings and having a clevis straddling said axle, a king pin therefor fixed in said axle, a lubricant inlet extending into said king pin, a swivel plug threaded into the upper end of the kin pin, said king pin having a bore connecting said inlet to said plug, a swivel collar about said plug with a plurality of outlets, conduits connecting the outlets to said control bearings on the knuckle, oblique restriction pins in the swivel plug controlling the flow under pressure through said outlets of lubricant delivered to the swivel plug upward through said king pin bore, one of said restriction pins dripping lubricant to the top of said king pin.

30. The combination of an axle, a steering knuckle, a king pin providing a pivot mount for the knuckle, control bearings rigid with said knuckle, an inlet fitting connected to a part of said pivot mount rigid with said axle, a swivel member coaxial with the pivot mount rigid with said axle, and connected to said inlet through a passage lengthwise of said pivot mount, a coacting distributing swivel member movable with the knuckle, outlet pipes connected to said distributing swivel member for supplying said knuckle control bearings, flow restriction pins in said stationary swivel member to control the delivery through said outlet pipes upon application of pressure, and a restriction pin transversely through said king pin pivot mount restricting the direct outlet to the king pin bearing.

31. The combination of an axle. a knuckle having a clevis and carrying associated bearings, a king pin rigid with said axle providing a pivot mount for said knuckle, a swivel plug threaded into the upper end of said king pin, a swivel collar coacting with said plug and having a plurality of outlets supplying lubricant to said bearings, a lubricant inlet extending transversely into said king pin between said clevis jaws to be supplied with lubricant pressure from a remote source, a passage coaxially through said king pin connecting said inlet to said swivel plug, restriction pins in said swivel plug to control the rate of flow of lubricant to the outlets of said swivel collar, and a polygonal pin fitting with minute clearance in a transverse bore connecting the axial bore of said king pin with the bearing surface thereof.

32. The combination of an axle, a steering knuckle having a clevis straddling said axle, a king pin bearing therefor fixed in said axle, a lubricant supply conduit extending along said axle and delivering into said king pin between the jaws of said clevis, and a duct through said king pin connecting said supply conduit to said bearing, a restriction being provided at the end of said duct to regulate the amount of lubricant supplied to the bearing, said duct being provided with an outlet to the bearing and said restriction being formed by providing a threaded member to plug a portion of the outlet to said bearing, to restrict and control the rate of discharge of lubricant thereto.

33. In a front wheel construction of the type comprising a knuckle having a king pin pivot mount in the axle, front wheel control appurtenances having bearings, a front wheel brake and a brake control shaft bridging transversely from the chassis to the knuckle; the combination therewith of means for lubricating the bearings of said appurtenances, said means comprising an inlet substantially at the knuckle pivot axis, a distributing fitting near one end of the king pin and supplied from said inlet through a duct longitudinally of the king pin, a draining pipe from said distributing fitting to one of the control appurtenances, means for preventing draining an excessive proportion of the lubricant through said drain pipe, and a connecting pipe for passing lubricant between the top of the king pin and the contiguous bearings of the brake control shaft.

34. In a front wheel construction of the type comprising a knuckle having a king pin pivot mount in the axle, front wheel control appurtenances having control bearings, a front wheel brake and a brake control shaft, the latter bridging transversely from the chassis to the knuckle; the combination therewith of a lubricant inlet connected at a stationary part of the knuckle pivot, a distributing swivel at the upper end of the king pin, said swivel having a stationary member supplied from said inlet through a longitudinal duct in said king pin and also having a distributing member fixed with respect to said knuckle and coacting with said stationary member, outlets from said distributing swivel, pipes connected therefrom to the bearings of the control appurtenances, and control means associated with said swivel for simultaneous delivery of lubricant upward to said brake operating shaft and downward to the control bearings.

Signed at New York, in the county of New York and State of New York, this 5th day of November, A. D. 1923.

JOSEPH BIJUR.